United States Patent [19]

Worthington

[11] 3,771,364
[45] Nov. 13, 1973

[54] DIRECT READING COMFORT INDEX THERMOMETER

[76] Inventor: Mark N. Worthington, 10227 White Mountain Rd., Sun City, Ariz. 85351

[22] Filed: Apr. 7, 1972

[21] Appl. No.: 242,020

[52] U.S. Cl.................................. 73/336, 73/338
[51] Int. Cl............................................ G01w 1/06
[58] Field of Search.................... 73/338, 336, 338.3

[56] References Cited
UNITED STATES PATENTS

| | | | |
|---|---|---|---|
| 2,120,952 | 6/1938 | Parsons............................. | 73/336 |
| 2,193,519 | 3/1940 | Parsons............................. | 73/338 |

Primary Examiner—Richard C. Queisser
Assistant Examiner—Denis E. Corr
Attorney—Eric P. Schellin et al.

[57] ABSTRACT

This specification discloses a direct reading comfort index thermometer for determining the temperature, humidity and air movement index of the ambient atmosphere, comprising a panel displaying a row of calibrations, a transparent tube mounted on said panel along said row, a tubular reservoir connected at its mid-point to one end of said tube and a temperature-responsive liquid in said reservoir which rises or falls in said tube in response to change in ambient conditions. One leg of the tubular reservoir is covered, or partially covered, with a water absorbent material such as a fabric. A chart along side of said calibrations shows corrections to apply to index readings for various air movement conditions, which chart may be expressed as degrees to be deducted from the comfort index or as percentages to be deducted from the index.

9 Claims, 4 Drawing Figures

PATENTED NOV 13 1973 3,771,364

DIRECT READING COMFORT INDEX THERMOMETER

The present invention relates to comfort index thermometers which determine the temperature, humidity and air movement index, and is concerned primarily with a direct reading thermometer of this type which is the epitome of simplicity and low cost. Hereinafter, the instrument will be referred to as THAMI (temperature, humidity, air movement index).

BACKGROUND OF THE INVENTION

The ambient conditions which determine the comfort index for human beings includes three basic factors. One of these is actual temperature. The second is the humidity of the air, and the third is air movement. All of these factors are mutually interrelated in determining and indicating a comfort index.

It is now well recognized that a person may experience varying degrees of comfort at any particular actual temperature. Thus, if the humidity of the ambient air is high, he is subjected to a greater degree of discomfort than if it is low. Moreover, for any given temperature and humidity, movement of surrounding air affects the resulting comfort.

The relation of humidity to actual temperature has long been recognized in determining a comfort index. In U.S. Pat. No. 3,095,742, there is disclosed a direct reading comfort index thermometer which includes a bulb, one-half of which is covered by a moisture absorbent fabric in the form of a wick. This wick extends into a reservoir and the presence of the latter incorporates a degree of complexity into the device. Moreover, the near proximity of the body of water at air temperature may distort the temperature at the bulb. Also, this device does not provide a means for correcting the reading to make allowances for air movement which is the important factor in a complete comfort index.

Most comfort indices patented or on the market are intended for use during the warm seasons of the year and they do not provide a means for allowing for air movement. However, it is believed to be highly desirable to provide a device which may be used during the colder seasons as well, and does make allowances for air movement. THAMI operates as a normal thermometer below 32°F and may be used as a normal thermometer at any time it is desired.

THAMI is calibrated under still air conditions to closely approximate the Comfort Chart or Table of Effective Temperatures as established by the American Society of Heating and Ventilating Engineers. Since it is a known fact that body comfort is effected by air movement, as well as by the temperature and humidity, it is desirable, then, to provide a means which allows for the effect of various wind velocities on body comfort.

Under still air conditions, an insulating layer of air forms around the bare portion of the reservoir containing the liquid which is responsive to the temperature changes. This insulating layer somewhat retards the transmission of heat from the air to the bare portion of the reservoir. As the velocity of the air increases, it wipes off the insulating layer and permits a greater transmission of heat from the air to the bare tube and thus causes the temperature to increase and the temperature-responsive liquid rises in the transparent calibrated tube to a point above that which would be indicated in still air and thus the effect of air movement registers on the calibrated tube. To reflect the effects of the air movement in terms of body comfort, the corrective chart or scale is used along side of the thermometer.

Since it is an established fact that moving ambient air causes the body to feel cooler in warm weather and colder in cold weather, it becomes highly desirable to make proper adjustments for various air velocities in order to obtain meaningful, reliable and consistent THAMI readings. It should be understood that the figures shown on the correction chart along side the calibrated tube in FIG. 1 are for the purpose of illustration only. The true corrections are determined under controlled conditions using various air velocities. The resulting corrections may be expressed by a chart or scale as indicated in FIG. 1, by percentages or even by the use of curves. However, for the purpose of simplicity, it is desirable to express the correction in degrees since this method is more easily understood by the general public.

At temperatures 32°F and colder, any water applied to the water absorbent material would freeze and there would be no further evaporation and, therefore, humidity would have no further effect on the thermometer. Hence, at 32°F and below, THAMI will function as a normal thermometer, except that the corrective chart permits an adjustment for the wind chill factor.

It should be understood that the corrective chart might include more columns to describe wind conditions, such as "Wind", "High Wind", etc. in order to cover a wider range of wind velocities. But for use by the average person, it is believed that the two columns indicated in FIG. 1 are less confusing and are sufficiently accurate for general purposes.

The present invention is founded on the concept of providing a direct reading comfort index thermometer (THAMI) which includes a tubular reservoir for the temperature-responsive liquid which is connected at its center to the mid-point of the tube with which the calibrations are associated. Such a reservoir may be readily produced in the size required for covering one side thereof with a moisture absorbent material and which will be effective for an appreciable period of time after it is saturated with water. A period of 3 to 5 minutes is indicated as required after fabric is wet to obtain a true reading.

OBJECTS OF THE INVENTION

With the foregoing conditions in mind, the present invention has in view the following objectives:

1. To provide a direct reading comfort index thermometer which is the epitome of simplicity and low cost, and which correlates the effect of temperature, humidity and air movement on human comfort.

2. To provide a direct reading comfort index thermometer (THAMI) which may also be used as an ordinary thermometer indicating actual temperature.

3. To provide, in a direct reading comfort index thermometer of the type noted, a scale alongside of a transparent tube for correcting index reading to adjust for air movement.

4. To provide a comfort index thermometer (THAMI) including a transparent tube having one end connected to the mid-point of a tubular reservoir which contains a temperature-responsive fluid, with one leg of said reservoir being covered by a water absorbent material.

5. To provide, in a direct reading comfort index thermometer (THAMI) of the type noted, a tubular reservoir in the form of an inverted "V", the apex of which is connected to the transparent tube.

6. To provide, in a direct reading comfort index thermometer (THAMI) of the character aforesaid, a tubular reservoir having the shape of an inverted "U" which is connected at its center to the transparent tube.

7. To provide, in a direct reading comfort index thermometer (THAMI) of the kind described, a tubular reservoir consisting of a straight tube which is connected at its center to the transparent tube.

8. To provide, in a comfort index thermometer of the type noted, a panel which is adapted to contain a supply of water and which includes a front wall formed with an aperture over the leg of the reservoir which is covered by a water absorbent material, together with means for controlling the flow of water through said aperture.

Various other more detailed objects and advantages of the invention such as arise in connection with carrying out the above ideas in a practical embodiment will, in part, become apparent, and, in part, be hereafter stated as the description of the invention proceeds.

SUMMARY OF THE INVENTION

The foregoing objects and advantages are achieved by providing a direct reading comfort index thermometer which consists essentially of a panel, an elongate transparent tube mounted on said panel, calibrations on either the tube or panel to indicate the position of one end of a column of a temperature-responsive liquid in the tube, and a reservoir containing the temperature-responsive liquid and in the form of a tube which is connected at its center to the transparent tube, and one leg of which is covered, or partially covered, by a water absorbent material. Changing the extent of the area covered by the water absorbent material may be used as a means of adjusting the calibration of the instrument.

In a more refined embodiment, the panel is formed as a hollow member adapted to contain a supply of water and the front wall thereof has an aperture located over the lower end of the leg which is covered with the water absorbent material. This aperture may be closed by a removable plug or a simple valve.

For a full and more complete understanding of the invention, reference may be had to the following description and the accompanying drawing, wherein.

The THAMI (temperature-humidity-air movement index) referred to herein is for indicating the comfort or discomfort of persons subjected to the ambient atmospheric conditions. THAMI gives a direct reading without the use of other instruments, graphs or charts and is calibrated so that the readings closely approximate the ASHVE (American Society of Heating and Ventilating Engineers) Effective Temperature Charts, except that THAMI covers the full range of ambient temperatures. It is more accurate and constant because it does not depend upon the experimental data obtained from the feelings of human subjects.

THAMI provides an extremely simple and inexpensive method of obtaining reliable, consistent, constant and accurate comparisons of comfort conditions between various localities under different ambient atmospheric conditions. It provides a means of comparing the comfort conditions of various times and places from day to day or hour by hour. The use of THAMI could simplify and standardize weather reporting on a meaningful basis that the public could understand.

THAMI has no moving parts, no delicate mechanisms which are easily broken and no adjustments are required. It can be used by anyone without previous instruction or experience.

THAMI may be used as an ordinary thermometer whenever it is desired, winter or summer.

DESCRIPTION OF A PREFERRED EMBODIMENT

Figure 1:
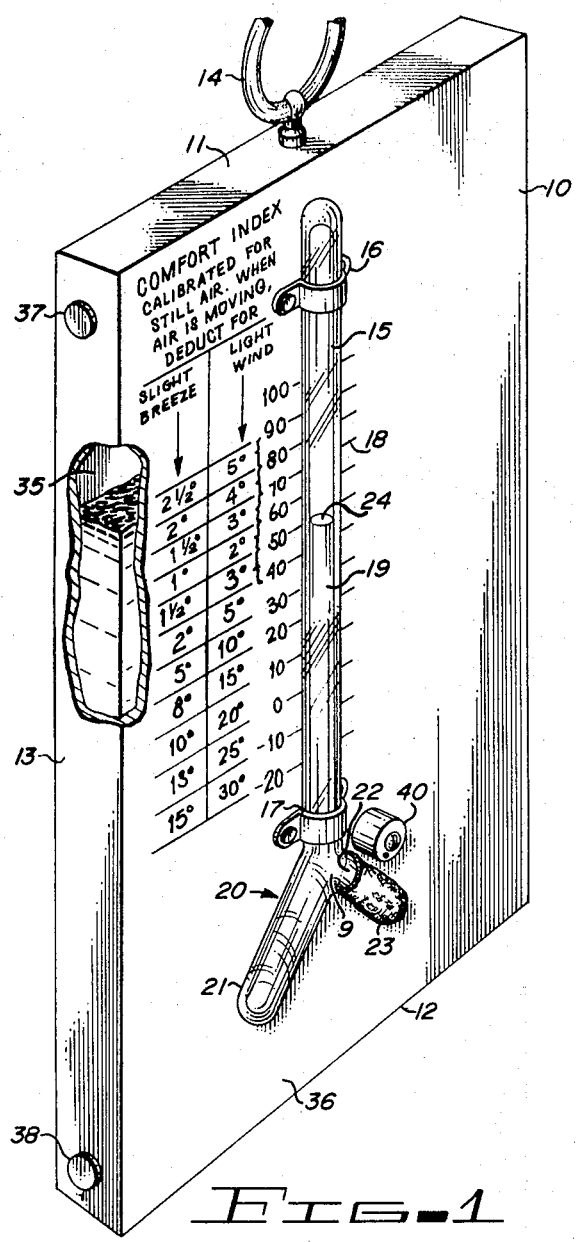
FIG. 1 is a perspective of a direct reading comfort index thermometer embodying the principles of this invention.

Referring now to the drawing wherein like reference characters denote corresponding parts, and first more particularly to FIG. 1, a panel is designated 10. This panel may be of any preferred material, such as metal, wood, plastic, etc. While its shape is susceptible of some variation, it ordinarily will be of an elongate form presenting end and side edges such as top edge 11, bottom edge 12 and side edges 13. It is to be clearly understood that the rectangular shape illustrated is not a limitation on the invention.

Ordinarily, thermometers are hung in a suspended position from a support such as a hook which is located in the particular area or premises in which it is desired to determine the comfort index. Thus, a suspension means in the form of a loop 14 is shown as secured to the upper edge 11. This loop 14 will engage some element such as the above mentioned hook (not illustrated) in suspending the panel 10 in a vertical position. It is important to note, however, that the subject thermometer is entirely accurate and effective when in positions other than the vertical and may be used when a panel 10, if solid, is in a horizontal position. For ascertaining the true temperature, humidity, air movement index, the instrument should be placed in the shade where there is a free circulation of ambient air. After the water absorbent material is wet, 3 to 5 minutes should be allowed before an accurate reading may be obtained.

A transparent tube is designated 15. While the drawing shows the entire tube as being transparent, it will be understood that only a portion thereof need be transparent. Thus, a transparent strip extending from end to end would be entirely satisfactory. The tube 15 may be of any transparent material such as glass or plastic. Tube 15 is mounted on panel 10 by brackets 16 and 17. Obviously any suitable fastening devices for this purpose may be employed.

Panel 10 is formed with a row of calibrations 18 in back of tube 15 so that the level of a temperature-responsive liquid 9 in the tube will show at one of the calibrations. In this respect, it is notable that the tube itself may carry the calibrations without departing from the spirit of the invention. The temperature-responsive liquid 19 may be mercury, in accordance with accepted practice in this art, spirits or any other liquid, the volume of which is affected by temperature changes to the extent required of a thermometer.

A reservoir for the temperature-responsive liquid 19 is referred to generally at 20. It comprises a tube consisting of two tubular legs 21 and 22 in angular relation which meet at an apex 9. The reservoir 20 communicates with tube 15 at the lower end of the latter and at apex 9.

Ordinarily, the comfort index relates to the average person. It may vary to some small degree with different people. However, this average is indicated by the mean of actual temperature and the temperature as affected by humidity and air movement. THAMI is calibrated so that the readings closely approximate the ASHVE effective temperature curves. Thus, to reflect this mean, the tubular legs 21 and 22 should be of the same length. One of these legs is left bare or uncovered, while the other is covered by water absorbent material, such as fabric from which water will evaporate at various rates depending on the humidity of the air and the movement of air over it. In the device of FIG. 1, the leg 21 is shown as bare and the leg 22 as covered with a fabric 23. A chart alongside of said calibrated tube shows corrections to apply to index readings for various air movement conditions, which chart may be expressed as degrees to be deducted from the comfort index or as percentages to be deducted from the comfort index.

It is evident that the legs 21 and 22 may have an extent necessary to provide a sufficient area of coverage for leg 22, so that after fabric 23 is saturated with water, the evaporation of water therefrom will extend over an appreciable period of time, such as 3 to 5 minutes. By changing the size of the area covered by the water absorbent material, the THAMI calibration may be adjusted to correspond to a predetermined temperature, humidity and air movement condition and thus may be used to test the air of an air conditioned space. Such use is indicated for industrial or commercial purposes.

MODE OF OPERATION

While the manner in which the direct reading comfort index thermometer of FIG. 1 is used and functions is believed to be obvious from the illustrations of the drawing and decription of parts set forth above, it may be briefly outlined as follows:

Water is applied to the fabric 23 in any desired manner, such as in the form of drops, until the water absorbent material is saturated. The water will evaporate from the fabric at a rate dependent on the humidity of the ambient atmosphere and the movement of ambient air relative to the leg 22. The results of this evaporation, combined with ambient temperature, determined the degree to which the volume of liquid 19 in leg 22 is altered.

At the same time, the volume of liquid 19 in leg 21 is affected only by the actual ambient temperature. Thus, the extent to which the column of liquid rises or falls in tube 15 is a resultant of the expansion or contraction of the liquid in the two legs 21 and 22. The top of column 19 which is designated 24 will indicate at one of the calibrations 18 the comfort index at any particular time in the premises at which the thermometer is located. The chart for air movement correction, alongside of the tube 15, is provided to obtain the correct THAMI reading.

At temperatures 32°F and colder, any water applied to the water absorbent material would freeze and there would be no further evaportion and, therefore, humidity would have no further effect on the thermometer. Hence, at 32°F and below, THAMI will function as a normal thermometer, except that the corrective chart permits an adjustment for the wind chill factor.

It is evident that the comfort index thermometer described above is susceptible of use as an ordinary thermometer indicating actual temperatures at any time. To achieve such use, all that is required is to leave the fabric covering 23 dry, under which conditions no evaporation will occur and the temperature-responsive liquid therein will be affected only by actual temperatures.

FIRST MODIFICATION

Figure 2:
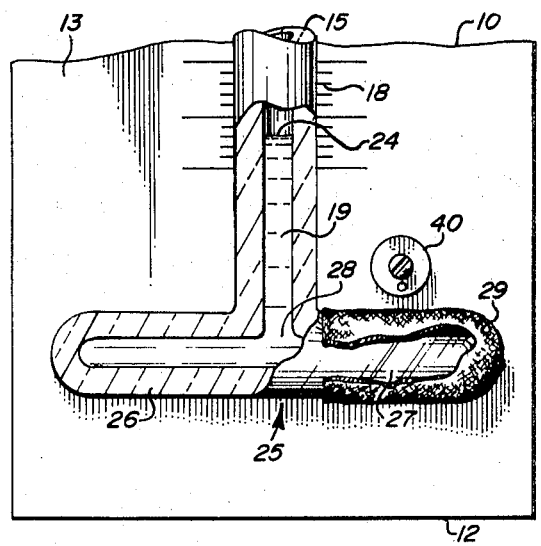
FIG. 2 is a detailed front view, partly in elevation and partly in section, of a modified form of reservoir.

Referring now to FIG. 2, a modified form which the reservoir may take is illustrated therein. In this FIG., the elements which are common to corresponding elements in FIG. 1 bear the same reference characters. Tube 15 is connected at its lower end to a reservoir designated generally 25. Reservoir 25 comprises two sections or legs 26 and 27 which are of the same length and which meet at the center of the reservoir. It is connected at this central point designated 28 to the lower end of tube 15. Leg 27 is covered by a water absorbent material 29 which is comparable to the material 23 of FIG. 1. The device of FIG. 2 functions in exactly the same way as described above in connection with FIG. 1.

SECOND MODIFICATION

Figure 3:
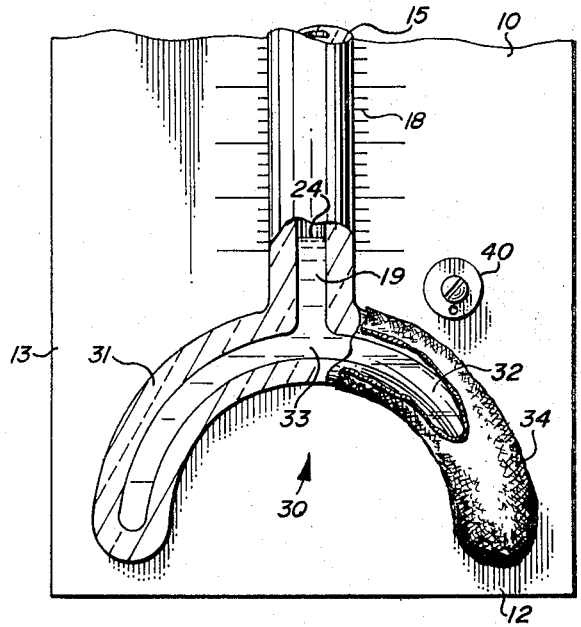
FIG. 3 is another detailed view, partly in elevation and partly in section, of another modification.

Referring now to FIG. 3, it is again noted that the elements corresponding to those of FIG. 1 are designated by the same reference characters. A reservoir is referred to in its entirety by the reference character 30, and is of a tubular construction presenting two curved legs 31 and 32 which are joined at a central point 33 and which together define an inverted "U". Leg 32 is covered with a water absorbent material 34 corresponding to the water absorbent materials 23 and 29 of FIGS. 1 and 2 respectively. The device of FIG. 3 functions in exactly the same manner as that of FIG. 1.

THIRD MODIFICATION

A third modification is included in the disclosure of FIG. 1. While panel 10 may be solid in the most simplified form of the invention, in a more refined form it is hollow, in which event top and bottom edges 11 and 12 take the form of top and bottom walls and side edges 13 take the form of side walls. The panel 10 will also include a rear wall 35 and a front wall 36. This wall structure defines a hollow or space which is adapted to contain a supply of water. An inlet for supplying such water to the interior of the panel is indicated at 37 as formed in one of the side walls 13 and a drainage outlet 38 is also formed at the lower end of a side wall 13.

Figure 4:
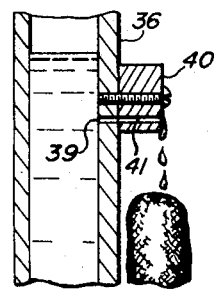
FIG. 4 is a detailed view, partly in section and partly in elevation, illustrating a portion of the front panel wall and a simple valve in exploded relation. Other means for controlling the flow of water through aperture such as a plug may be used.

Front wall 36 is formed with a small aperture 39 immediately over the lower end portion of leg 22. Closure means is provided for closing aperture 39, but is operable to open said aperture. Referring now more particularly to FIG. 4, which illustrates a portion of front wall 36 with the aperture 39 therein, the closure means is provided in the form of a valve 40, having a passage 41 which is adapted to align with aperture 39 to render the latter effective as a "weep hole", which turns the water on or off as occasion demands. Obviously, a plug may be used in lieu of valve 40.

It is evident that this highly refined embodiment of the invention is susceptible of use either as a thermometer for actual temperatures or as a comfort index thermometer by simply closing valve 40 over aperture 39 or by opening it. When in aperture closing position, no water will fall onto fabric 23 and the device functions as an ordinary thermometer indicating actual temperatures. When the aperture is opened, water from the supply in the hollow panel will drip onto the fabric 23 and maintain it in substantially saturated condition. Thus, there is provided the continuous effect of a comfort index thermometer.

While preferred specific embodiments are herein disclosed, it is to be clearly understood that the invention is not to be limited to the exact constructions, materials and designs illustrated and described, because various modifications of these details may be provided in putting the invention into practice.

What is claimed is:

1. In a direct reading index thermometer for combining the effects of air temperature, relative humidity and air movement into a single reading of effective temperature of the ambient atmospheric condition:
   a. a hollow panel containing water and including a front wall formed with an aperture;
   b. a tube mounted on said front wall in a vertical position and including a longitudinally extending transparent portion;
   c. a tubular reservoir connected to and communicating with said tube at the lower end thereof, with a portion of said reservoir being disposed below said aperture;
   d. a temperature-responsive liquid in said reservoir and extending into said tube in the form of a column having an upper end;
   e. index reading calibrations indicating the position of said upper end of said column;
   f. a water absorbent material covering one-half of said reservoir and which half is included in the portion of the reservoir below said aperture;
   g. a scale on said panel alongside of said tube indicating degrees by which the index reading is to be corrected for air movement; and
   h. a valve in said aperture for controlling the flow of water therethrough.

2. The direct reading index thermometer of claim 1 in which the tube is completely transparent and the calibrations are on the panel.

3. The direct reading index thermometer of claim 1 together with means on said panel for supporting it in a suspended position.

4. The direct reading index thermometer of claim 1 in which the temperature-responsive liquid is mercury.

5. The direct reading index thermometer of claim 1 in which the reservoir is tubular and comprises two portions of equal size which take the form of two legs in angular relation and meet at an apex which is the center of the reservoir.

6. The direct reading index thermometer of claim 5 in which the legs of the reservoir define an inverted "V".

7. The direct reading index thermometer of claim 5 in which the legs of the reservoir are in alignment.

8. The direct reading index thermometer of claim 5 in which the reservoir is in the form of an inverted "U" which presents the two legs which meet at its center.

9. The direct reading index thermometer of claim 1 in which the water absorbent material is a fabric.

* * * * *